United States Patent
Fujiwara

(10) Patent No.: US 8,514,413 B2
(45) Date of Patent: Aug. 20, 2013

(54) IMAGE PROCESSING APPARATUS, IMAGE FORMING SYSTEM, AND IMAGE FORMING METHOD

(75) Inventor: Satoko Fujiwara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 161 days.

(21) Appl. No.: 13/045,063

(22) Filed: Mar. 10, 2011

(65) Prior Publication Data

US 2011/0228301 A1    Sep. 22, 2011

(30) Foreign Application Priority Data

Mar. 17, 2010    (JP) .................................. 2010-061665

(51) Int. Cl.
*G06K 15/00*    (2006.01)
*G06F 3/12*    (2006.01)

(52) U.S. Cl.
USPC ........ 358/1.12; 358/1.13; 358/1.15; 358/1.18

(58) Field of Classification Search
None
See application file for complete search history.

(56) References Cited

U.S. PATENT DOCUMENTS

| 2007/0024909 A1* | 2/2007 | Hanechak | 358/1.18 |
| 2007/0070374 A1* | 3/2007 | Boyes et al. | 358/1.13 |
| 2010/0165384 A1* | 7/2010 | Fukase et al. | 358/1.15 |

FOREIGN PATENT DOCUMENTS

| JP | 2001-339599 | 12/2001 |
| JP | 3343367 | 8/2002 |

* cited by examiner

*Primary Examiner* — Marivelisse Santiago Cordero
*Assistant Examiner* — Brett Gardner
(74) *Attorney, Agent, or Firm* — Oblon, Spivak, McClelland, Maier & Neustadt, L.L.P.

(57) ABSTRACT

An image processing apparatus is connected to a print control device that controls a single printer, the apparatus includes a first generating unit that generates a first corrected image by adding an adjustment image to one of edges in the first direction of the first image such that a length in the first direction is equal to an integral multiple of a predetermined boundary size, a second generating unit that generates a second corrected image by adding the adjustment image to at least one of both edges in the first direction of the second image such that the length in the first direction is equal to an integer multiple of the boundary size, and a transmission unit that transmits the first corrected image and the second corrected image to the print control device.

6 Claims, 12 Drawing Sheets

IMAGE PROCESSING APPARATUS, IMAGE FORMING SYSTEM, AND IMAGE FORMING METHOD

CROSS-REFERENCE TO RELATED APPLICATIONS

The present application claims priority to and incorporates by reference the entire contents of Japanese Patent Application No. 2010-061665 filed in Japan on Mar. 17, 2010.

BACKGROUND OF THE INVENTION

1. Field of the Invention

The present invention relates to an image processing apparatus, an image forming system, and an image forming method.

2. Description of the Related Art

To support print speed that is increasing every year, it is necessary to transmit and receive print data at high speed within a print system. This is required particularly in an ultra-high speed continuous form printer. In one known method of increasing the speed of data transmission-reception, transmission paths are provided for different colors. In another method, data is compressed to increase transmission efficiency.

In the technology proposed in Japanese Patent Application Laid-open No. 2001-339599, rasterized data sets for a plurality of pages to be printed are combined to generate data continuous in a main-scanning direction so that the plurality of pages are printed on one form. With this technology, the output operation for printing a plurality of pages on one form can be performed in an efficient manner.

In one known system (SED (Single Engine Duplex) system), duplex printing is achieved using one continuous sheet printer. More specifically, sheets are reversed in a printer engine so that two sheets are arranged at the position of one transfer drum or one ink head. In such an SED system, an RIP (Raster Image Processor) unit used for bitmapping of input data transmits to a print control unit one bitmapped image data set generated by arranging and bitmapping front-side data, blank area data for positional adjustment etc., and back-side data. Then the print control unit instructs a printer engine to print the received image data, and the images of both the front and back sides are thereby printed simultaneously.

However, in the conventional SED system, the image data including the blank area data is transmitted as described above, and this causes a problem in that the efficiency of data transmission is low.

The present invention has been made in view of the above circumstances, and it is an object of the invention to provide an image processing apparatus, an image forming system, and an image forming method that can improve the efficiency of data transmission in a duplex printing system such as an SED system.

SUMMARY OF THE INVENTION

It is an object of the present invention to at least partially solve the problems in the conventional technology.

According to an aspect of the present invention, there is provided an image processing apparatus connected to a print control device that controls a single printer to print a first image on a first side of one of continuous forms arranged in a predetermined first direction and to print a second image on a second side of another one of the continuous forms, including: a first generating unit that generates a first corrected image; a second generating unit that generates a second corrected image; and a transmission unit that transmits the first corrected image and the second corrected image to the print control device, wherein the first generating unit generates the first corrected image by adding an adjustment image to one of edges in the first direction of the first image such that a length in the first direction is equal to an integral multiple of a predetermined boundary size and the second generating unit generates the second corrected image by adding the adjustment image to at least one of both edges in the first direction of the second image such that the length in the first direction is equal to an integral multiple of the boundary size.

According to another aspect of the present invention, there is provided an image forming system including: a single printer; an information processing device that controls the printer to print a first image on a first side of one of continuous forms arranged in a predetermined first direction and to print a second image on a second side of another one of the continuous forms; and an image processing apparatus, wherein the image processing apparatus includes: a first generating unit that generates the first corrected image by adding an adjustment image to one of edges in the first direction of the first image such that a length in the first direction is equal to an integral multiple of a predetermined boundary size; a second generating unit that generates the second corrected image by adding the adjustment image to at least one of both edges in the first direction of the second image such that the length in the first direction is equal to an integral multiple of the boundary size; and a transmission unit that transmits the first corrected image and the second corrected image to the print control device, the information processing device includes: a reception unit for receiving the first corrected image and the second corrected image; a generating unit for generating a print image merged the first corrected image with the second corrected image; and a print control unit for instructing the printer to print the print image.

According to still another aspect of the present invention, there is provided an image forming method executed in an image forming system including a single printer, a print control device for controlling the printer to print a first image on a first side of one of continuous forms arranged in a predetermined first direction and print a second image on a second side of another one of the continuous forms, and an image processing apparatus, the method comprising: a first generating step of causing the image processing apparatus to generate a first corrected image by adding an adjustment image to one of edges in the first direction of the first image such that a length in the first direction is equal to an integral multiple of a predetermined boundary size; a second generating step of causing the image processing apparatus to generate a second corrected image by adding the adjustment image to at least one of both edges in the first direction of the second image such that the length in the first direction is equal to an integral multiple of the boundary size; a transmitting step of causing the image processing apparatus to transmit the first corrected image and the second corrected image to the print control device; a receiving step of causing the print control device to receive the first corrected image and the second corrected image; a generating step of causing the print control device to generate a print image merged the first corrected image with the second corrected image; and a print control step of causing the print control device to instruct the printer to print the print image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Preferred embodiments of an image processing apparatus, an image forming system, and an image forming method according to the present invention will next be described in detail with reference to the accompanying drawings.

First Embodiment

As described above, in the conventional SED system, the efficiency of data transmission is low because data generated by arranging and bitmapping the data of a front-side image (front-side data), the data of a back-side image (back-side data), and the data of blank areas is transferred. One method to address this problem is to transmit data generated by bitmapping front-side data and back-side data page by page to a print control unit. However, with this method, the print control unit must perform bit adjustment according to print positions after the data is received. Therefore, although the efficiency of data transmission can be improved, the time for processing other than data transmission is required, and this can cause a problem in that the overall processing efficiency is reduced.

An image forming system of the first embodiment is a print system (SED system) that can print a plurality of pages simultaneously, and print images (print data) are generated and transmitted page by page in a form that does not require a print control unit to perform bit adjustment according to print positions. More specifically, an RIP unit serving as an image processing apparatus performs boundary alignment when the print data is generated. In this processing, the leading head of back-side data to be placed on the right side of a print area of a printer engine is boundary-aligned such that the most efficient form for a print instruction provided to the printer engine is achieved, and the print data is bitmapped page by page.

In this manner, transmission of additional blank data conventionally transmitted as part of print data is suppressed, and the print control unit does not require bit adjustment. More specifically, the efficiency of data transmission can be improved without any reduction in the overall print processing efficiency.

Figure 1:
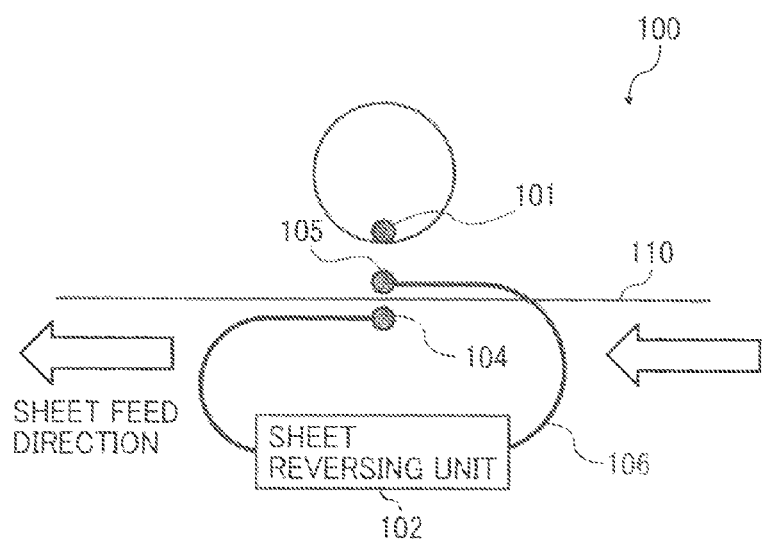
FIG. 1 is a diagram illustrating an image forming system of a first embodiment as viewed from its lateral side.
Figure 2:
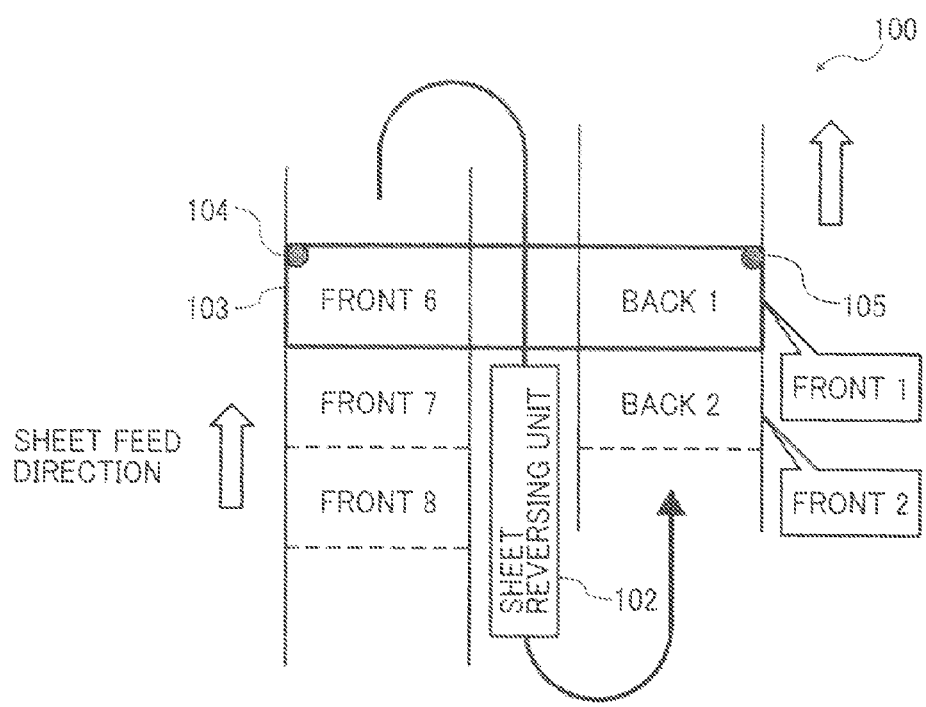
FIG. 2 is a diagram illustrating the image forming system of the first embodiment as viewed from above.
Figure 3:
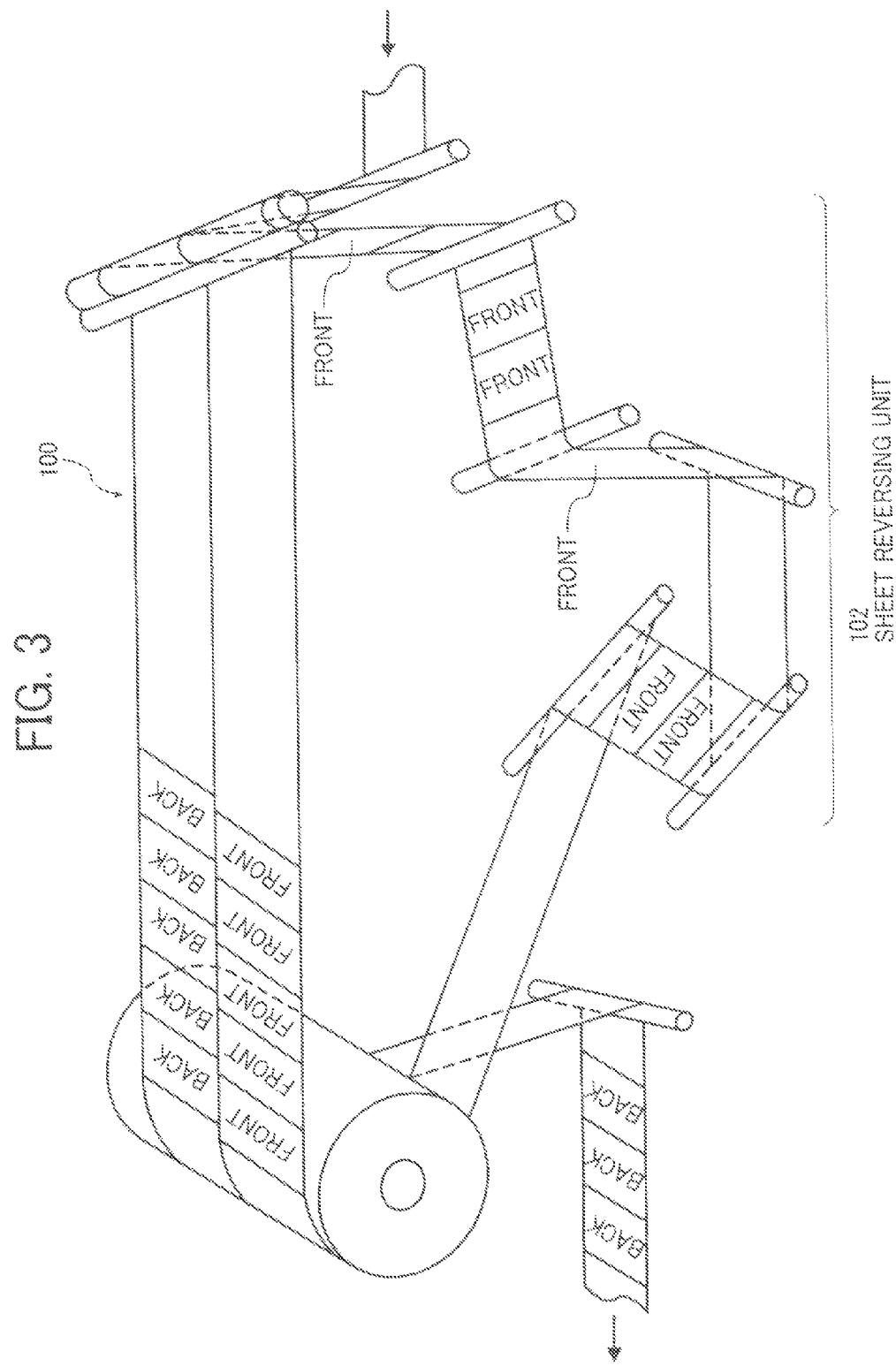
FIG. 3 is a diagram illustrating the image forming system of the first embodiment as viewed laterally obliquely from above.
Figure 4:
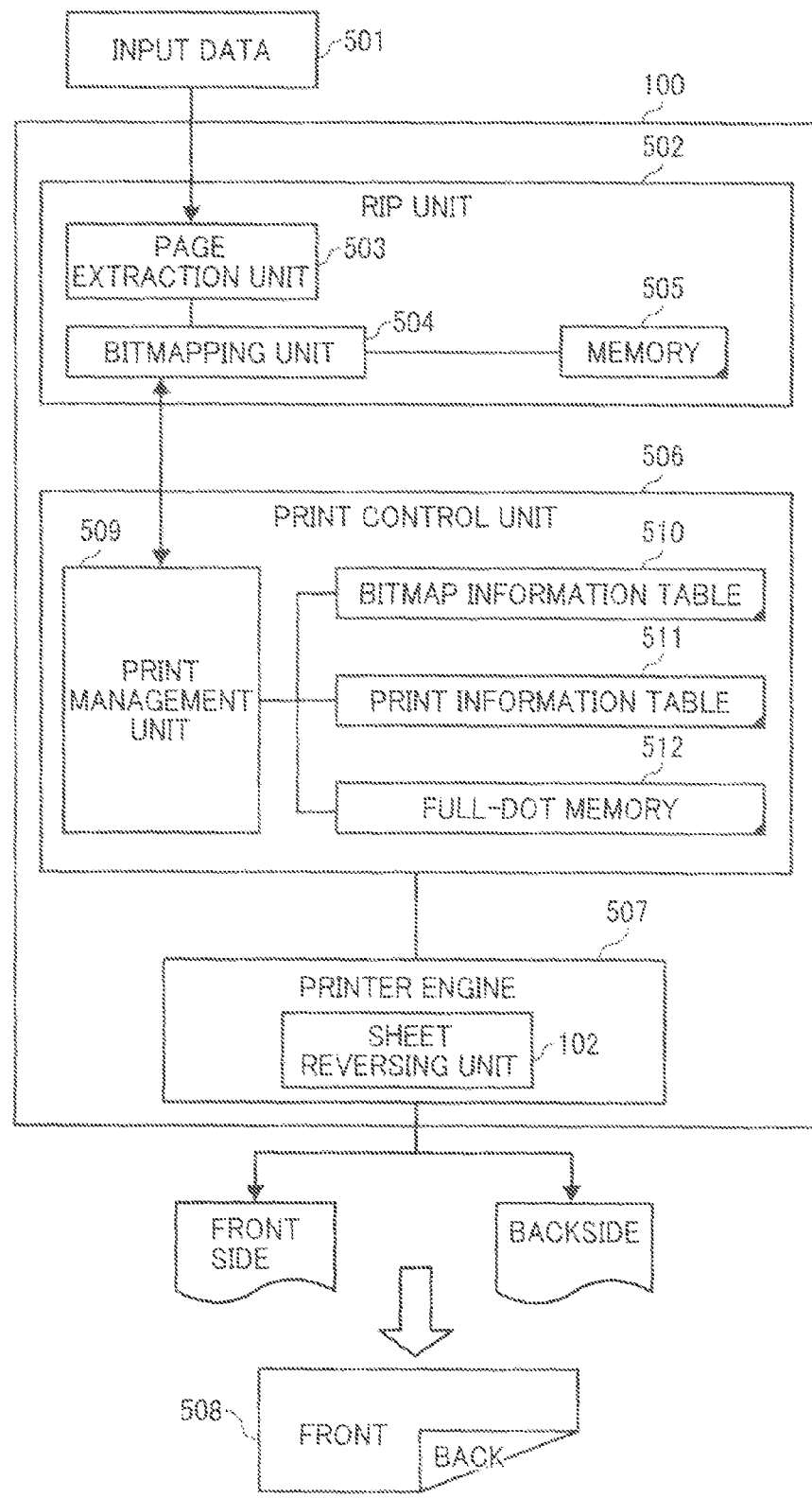
FIG. 4 is a block diagram illustrating an example of the configuration of the image forming system of the first embodiment.

First, the outline of the operation of the image forming system will be described with reference to FIGS. 1 to 4. FIG. 1 is a diagram illustrating an image forming system 100 of the first embodiment as viewed from its lateral side. FIG. 2 is a diagram illustrating the image forming system 100 of the first embodiment as viewed from above. FIG. 3 is a diagram illustrating the image forming system 100 of the first embodiment as viewed laterally obliquely from above. FIG. 4 is a block diagram illustrating an example of the configuration of the image forming system 100 of the first embodiment.

As shown in FIG. 4, the image forming system 100 includes, as main units, an RIP unit 502, a print control unit 506, and a printer engine 507.

As shown in FIGS. 1 to 3, the image forming system 100 uses one printer engine 507 that prints continuous forms. Sheets that have passed through a print point 101 during front-side printing are reversed by a sheet reversing unit 102 in the printer engine 507 and pass again through the print point 101 with the back-side facing the print point 101. Duplex printing is thereby achieved without providing a plurality of transfer drums or ink heads for both sides. With such an image forming system 100, both the front and back sides are printed concurrently. The sheet reversing unit 102 includes a plurality of rollers used to reverse the continuous forms (from the front side to the back side), as shown in, for example, FIG. 3. FIGS. 1 to 3 are examples only. Any other system configuration may be used so long as the continuous forms can be reversed and both the front and back sides thereof can be printed concurrently with one of the front and back sides arranged on the left side and the other side arranged on the right side.

When the image forming system 100 is used for duplex printing, the maximum printable sheet width is one-half the maximum printable from width for single-side printing. Sheets for front-side printing are loaded so as to be aligned with a front-side print reference point 104 being the left edge of a sheet placing area 103 of the printer engine 507, and sheets for back-side printing are loaded so as to be aligned with a back-side print reference point 105 being the right edge.

In the image forming system 100, when sheets are loaded, the length and width of the sheets are set on the printer engine 507 or the print control unit 506. A front-to-back distance 106 is the distance necessary for sheets to be reversed in the image forming system 100 so that the sheets pass through the print point 101 twice. This front-to-back distance 106 is a constant value depending on different printer engines 507 that support the image forming system 100. For example, when the image forming system 100 is powered on, the printer engine 507 notifies the print control unit 506 of the front-to-back distance 106 together with sheet information. The print control unit 506 computes a page difference from the front-to-back distance 106 and the length of the sheets. In the example shown in FIG. 2, the page difference is five, and the first page of the back-side (back 1) and the sixth page of the front-side (front 6) are printed concurrently.

The details of the function of each unit of the image forming system 100 will next be described with reference to FIG. 4.

The RIP unit 502 inputs input data 501, for example, in a PDL (page description language) format and performs rasterizing processing in which the input data 501, is bitmapped. The RIP unit 502 includes a page extraction unit 503, a bitmapping unit 504, and a memory 505.

The page extraction unit 503 extracts pages from the input data 501. The page extraction is detection of information of each page including page information corresponding to front page, page corresponding to back page, and other information from the input data 501. The bitmapping unit 504 performs bitmapping of data of each page on the memory 505.

The RIP unit 502 transmits the bitmap data extracted page by page and bitmap information (described later) related to the bitmap data to the print control unit 506.

The print control unit 506 generates one bitmap data set (print image) including a combination of front-side bitmap data (front-side data) and corresponding back-side bitmap data (back-side data) from the bitmap data received from the RIP unit 502 and then instructs the printer engine 507 to print the generated bitmap data set.

The print control unit 506 includes a print management unit 509, bitmap information tables 510, a print information table 511, and a full-dot memory 512.

Upon reception of the bitmap data and the bitmap information from the RIP unit 502, the print management unit 509 stores the bitmap data in the full-dot memory 512 and stores the bitmap information in the bitmap information tables 510. The print management unit 509 stores the bitmap information of front-side data and back-side data to be printed concurrently by the printer engine 507 in the print information table 511 and then instructs the printer engine 507 to print two pages simultaneously (part of the print management unit 509 is referred to as a control unit).

The printer engine 507 prints these two specified pages concurrently. Duplex print results 508 are thereby obtained.

Figure 5:
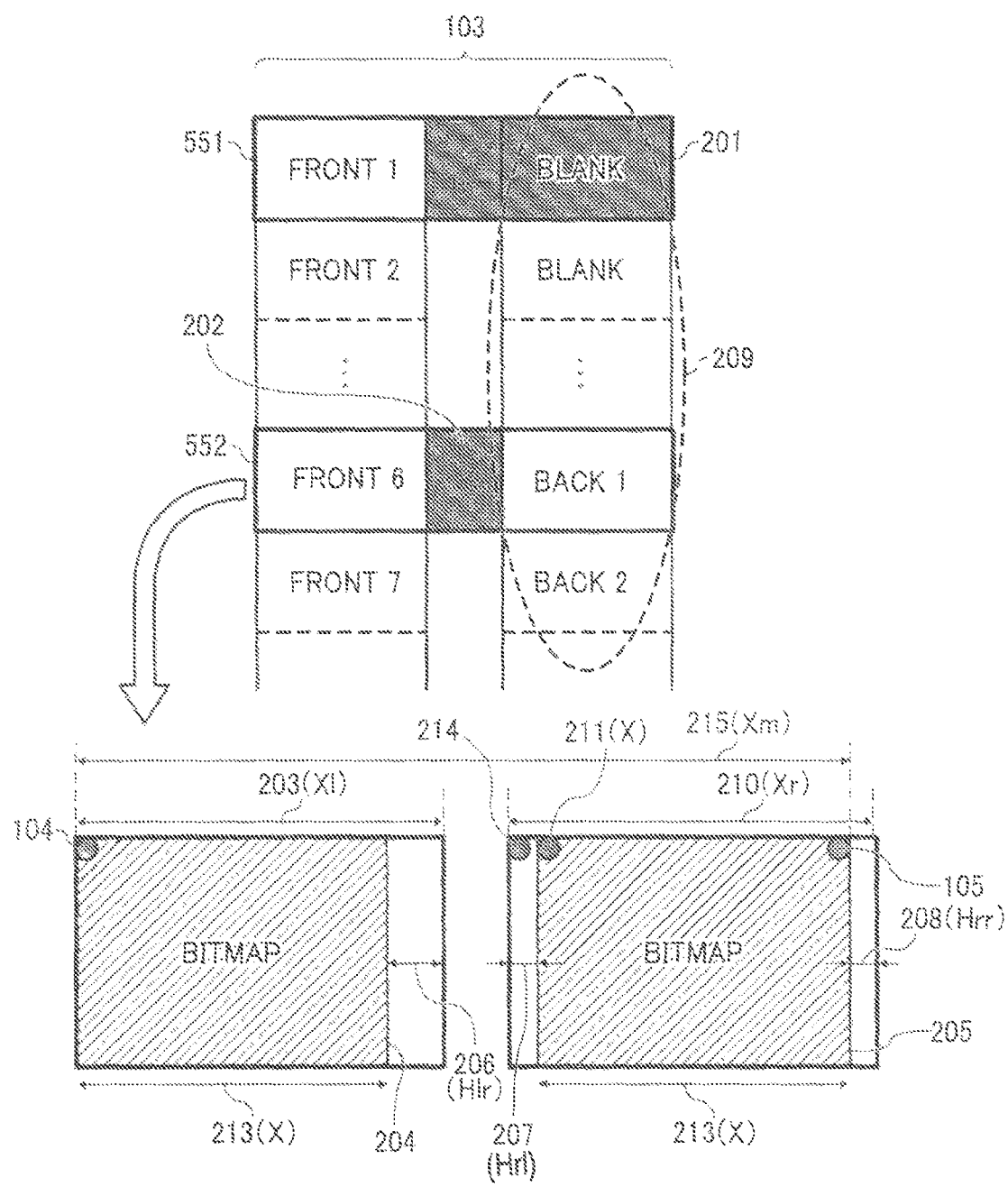
FIG. 5 is a diagram illustrating an example of a specific method of generating bitmap data.

FIG. 5 is a diagram illustrating an example of a specific method of generating bitmap data. To print both the front and back-sides concurrently, a merged bitmap, such as bitmap data 551 or bitmap data 552 in FIG. 5 for front-side data and back-side data must be prepared at least for the printer engine 507.

Suppose that the page difference is five, as in FIG. 2. The first page of the back side must be printed on the back of the first page of the front side. Therefore, the first page the back-side is merged with the sixth page of the front side. Since no print data to extract is provided to a back-side area 209 when the first to fifth pages of the front sides are printed, blank data 201 is provided to the right side of each merged bitmap (for example, the bitmap data 551).

The sheets are loaded so as to be aligned with the front-side print reference point 104 and the back-side print reference point 105. Therefore, when the sheets to be printed are smaller than one-half the sheet registration area 103, a blank area 202 must be provided between front-side data and back-side data.

In the present embodiment, when data is transmitted from the RIP unit 502 to the print control unit 506, blank data 201 and blank areas 202 are not transmitted, and the speedup of data transmission in the SED system is thereby achieved.

To omit the transmission of blank data 201 and blank areas 202, front and back sides are not merged in the RIP unit 502 but are merged in the print control unit 506. To merge the front and back sides efficiently in the print control unit 506, the RIP unit 502 generates the bitmap of each page such that the bitmap has a transmission size 203 (hereinafter referred to as a transmission size Xl) or a transmission size 210 (hereinafter referred to as a transmission size Xr). These transmission sizes Xl and Xr are set to an integral multiple of a boundary size B that allows the print control unit 506 to handle data in the most efficient manner. The print control unit 506 notifies the RIP unit 502 of the boundary size B at, for example, system startup.

Back-side data is printed so as to be aligned with the right edge of a print area 215 (hereinafter referred to as a print area Xm), i.e., to the back-side print reference point 105. The print area Xm is used to represent the length of the print area of the printer engine 507 in a main scanning direction (first direction). Therefore, the print control unit 506 computes a back-side lateral initial address 211 (hereinafter referred to as a back-side lateral initial address x) and an allocation address 214 from the print area Xm and a print data size 213 (hereinafter referred to as a print data size X) with the left edge of the print area Xm (i.e., the front-side print reference point 104) as the origin.

The print data size X represents the width of an inputted bitmap (such as a front-side bitmap 204 or a back-side bitmap 205) in the main scanning direction. The back-side lateral initial address x represents the length in the main scanning direction (lateral direction) from the front-side print reference point 104 to the left edge of the back-side bitmap 205. The allocation address 214 represents the length from the front-side print reference point 104 to the left edge of a bitmap that is corrected from the back-side bitmap 205 so as to have a size equal to an integral multiple of the boundary size (hereinafter referred to as corrected bitmap).

Front-side data is printed so as to be aligned with the left edge of the print area Xm, i.e., the front-side print reference point 104. Therefore, the allocation address and the lateral initial address of the front-side data are equal to the address of the origin.

Boundary adjustment is performed to generate a correction area 206 (hereinafter referred to as a correction area Hlr) on the right-hand side of the front-side bitmap 204. After the boundary adjustment, a correction area 207 (hereinafter referred to as a correction area Hrl) is generated on the left-hand side of the back-side bitmap 205, and a correction area 208 (hereinafter referred to as a correction area Hrr) is generated on the right-hand of the back-side bitmap 205.

The correction areas Hlr, Hrl, and Hrr are set to blank areas, i.e., images used for adjustment (hereinafter referred to as blank images) representing unprinted images. For example, when the RIP unit 502 performs bitmapping, it is assured to set a pixel value "0" on the blank images.

Figure 6:
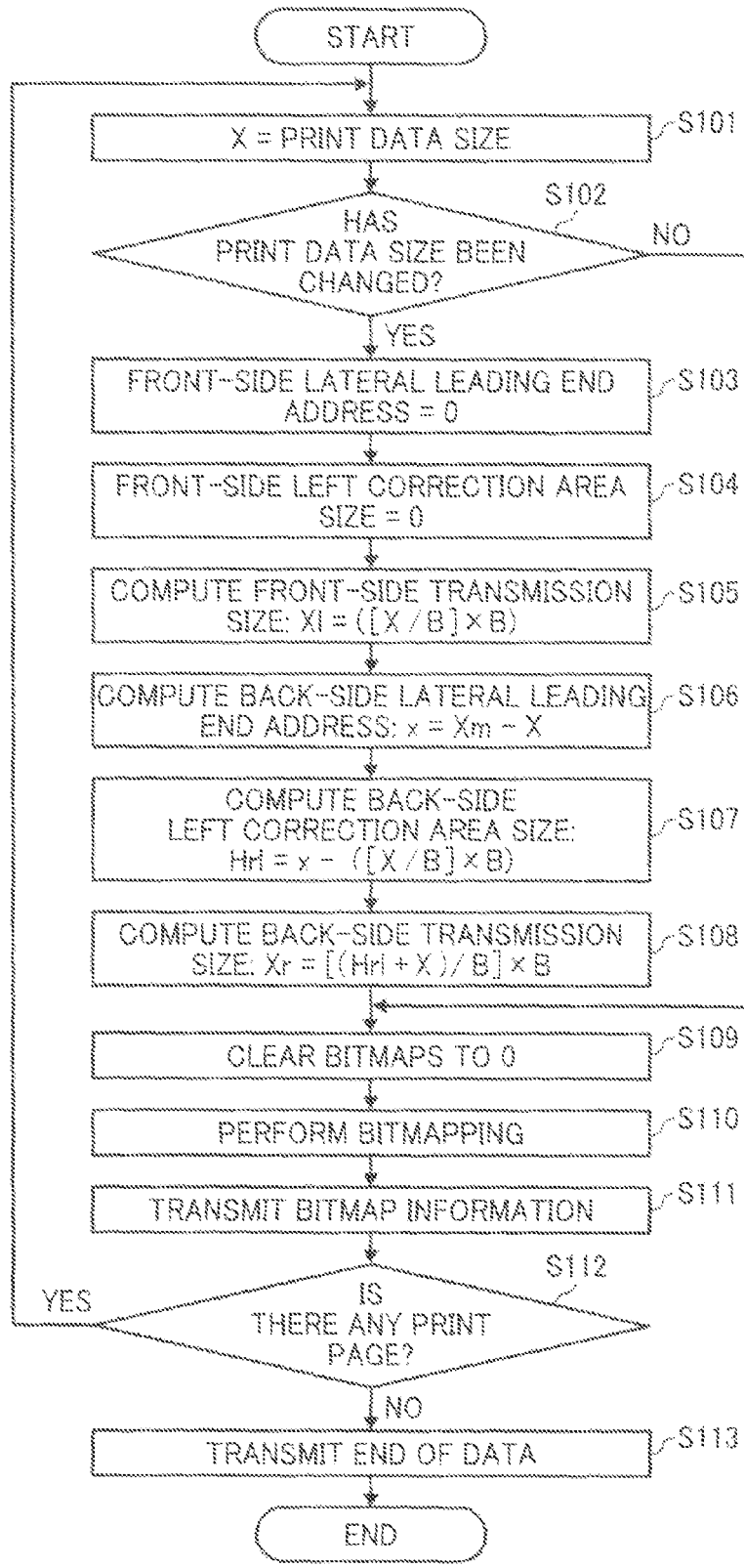
FIG. 6 is a flowchart showing an example of bitmapping processing.

Bitmapping processing by the RIP unit 502 will next be described with reference to FIG. 6. FIG. 6 is a flowchart showing an example of the bitmapping processing.

When the image forming system 100 is powered on, the RIP unit 502 receives, as printer information, the print area Xm and the boundary size B from the print control unit 506 and stores them in predetermined variables. The printer information is information intrinsic to the printer engine 507 and not changed during operation of the system.

First, the page extraction unit 503 of the RIP unit 502 retrieves the page information from the input data 501 and stores a print data size in a variable X (step S101). Next, the RIP unit 502 determines whether or not the print data size X has been changed (step S102). When, for example, the first page is processed, a determination is made by the RIP unit 502 that the print data size X is changed.

If the print data size X is changed (step S102: Yes), the RIP unit 502 set a front-side lateral initial address and a left-hand side correction area size of the front-side to "0" (steps S103 and S104).

Next, the RIP unit 502 computes the transmission size Xl for the front side from the print data size X and the boundary size B (step S105). More specifically, the RIP unit 502 computes the transmission size Xl using Xl=[X/B]×B. The brackets "[a]" mean the operation of rounding up the fractional part of "a."

Then the RIP unit 502 computes the leading head address x of the back-side in the lateral direction from the print area Xm and the boundary size B (step S106). More specifically, the RIP unit 502 computes the leading head address x of the back-side in the lateral direction using x=Xm−X.

Next, the RIP unit 502 computes the correction area Hrl on the left-hand side of the back-side from the leading head address x of the back-side in the lateral direction and the boundary size B (step S107). More specifically, the RIP unit 502 computes the correction area Hrl using Hrl=x−[X/B]×B. The brackets with an underline "[a]" mean the operation of dropping the fractional part of "a."

Then the RIP unit 502 computes the transmission size Xr for the back-side from the print data size X, the correction area Hrl, and the boundary size B (step S108). More specifically, the RIP unit 502 computes the transmission size Xr using Xr=[(Hrl+X)/B]×B.

If a determination is made in step S102 that the print data size X is not changed (step S102: No), the RIP unit 502 does not execute computation processing for various size (steps S103 to S108) and executes processing in next step S109 and later steps.

In step S109, the bitmapping unit 504 of the RIP unit 502 clears object bitmaps to "zero." Then the bitmapping unit 504 performs bitmapping on these object bitmaps in consideration of the correction area Hrl and the like. (step S110).

For a front-side bitmap, the bitmapping unit 504 starts bitmapping from the right edge of an object bitmap having a length in the lateral direction equal to the transmission size Xl. In this manner, a corrected bitmap (first corrected image) is generated in which a blank image has been appended to the right edge of the front-side bitmap (first image) so that the lateral length of the corrected bitmap is equal to an integral multiple of the boundary size B (part of the bitmapping unit 504 is referred to as a first generation unit).

For a rear-side bitmap, the bitmapping unit 504 starts bitmapping from the left edge and a location of the correction area Hrl on an object bitmap having a length in the lateral direction equal to the transmission size Xr. In this manner, a corrected bitmap (second corrected image) is generated. In this corrected bitmap, a blank image having a lateral length equal to the correction area Hrl (=the difference between the lateral initial address x of the back-side and the allocation address) is appended to the left edge of the back-side bitmap (second image), and another blank image is appended to the right edge of the back-side bitmap so that the lateral length of the corrected bitmap is equal to an integral multiple of the boundary size (part of the bitmapping unit 504 is referred to as a second generation unit).

Next, the RIP unit 502 transmits the bitmap information for each generated corrected bitmap to the print control unit 506 (step S111). The bitmap information includes, for example, print side information (the front or back-side), a page identification number, the print data size X, a lateral initial address (the lateral initial address of the front-side=0 or the lateral initial address x of the back-side), the allocation address, a transmission size (the transmission size Xr or the transmission size Xl), and the like. The allocation address can be computed by, for example, subtracting the print data size X and the correction area Hrl from the print area Xm.

Next, the RIP unit 502 determines whether or not there is an unprocessed print page (step S112). If there is an unprocessed print page (step S112: Yes), the process returns to step S101 to repeat the processing. If there is no unprocessed print page (step S112: No), the print control unit 506 is informed of the end of data (step S113), and the bitmapping processing is ended.

Figure 7:
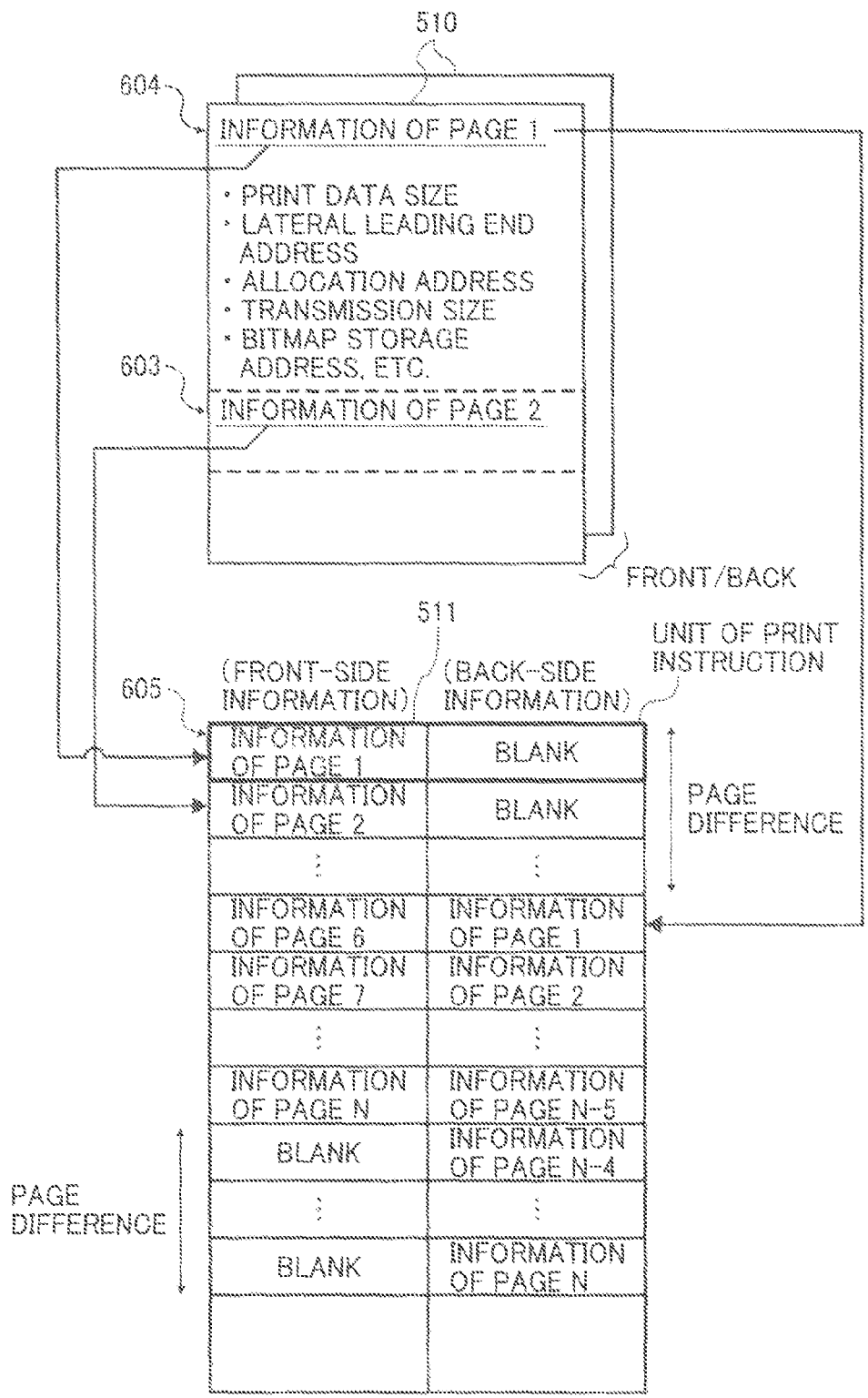
FIG. 7 is a diagram illustrating exemplary data structures of a bitmap information table and a print information table.

The print control unit 506 stores the bitmap information transmitted in step S111 in the bitmap information tables 510. The print control unit 506 consults the bitmap information tables 510 to generate the print information table 511. FIG. 7 is a diagram illustrating exemplary data structures of the bitmap information tables 510 and the print information table 511.

The bitmap information tables 510 are generated when the bitmap information is received from the RIP unit 502. As shown in FIG. 7, two bitmap information tables 510 including a table for the front side and a table for the back side are generated. Each bitmap information table 510 stores the bitmap information (including the print data size X, the allocation address, the transmission size Xl or the transmission size Xr, and the like) received from the RIP unit 502, bitmap storage addresses in the full-dot memory 512 in which the generated bitmaps are stored, and other information.

In each of the bitmap information tables 510 for the front and back sides, an input pointer 603 and an output pointer 604 are used for management. The input pointer 603 indicates the entry for the next data to be inputted and is updated each time data is inputted. The output pointer 604 indicates the next entry to be stored in the print information table 511 and is updated each time the print information table 511 is updated.

The print information table 511 is updated each time a front-side bitmap is received and stores combinations of pages to be printed. When the data of a front-side bitmap is received, the bitmap information of the received front-side bitmap is stored in association with the corresponding bitmap information of a back-side bitmap. Blank information ("blank" in FIG. 7) indicating a blank page is stored as back-side information of the page difference from the front-side first page and as front-side information of the page difference retrospective from the back-side last page.

Upon reception of the end of data from the RIP unit 502 (step S113), the print control unit 506 stores the received information of each front-side bitmap in the print information table 511 and also stores blank information or the corresponding information of a back-side bitmap in a corresponding back-side information field.

Figure 8:
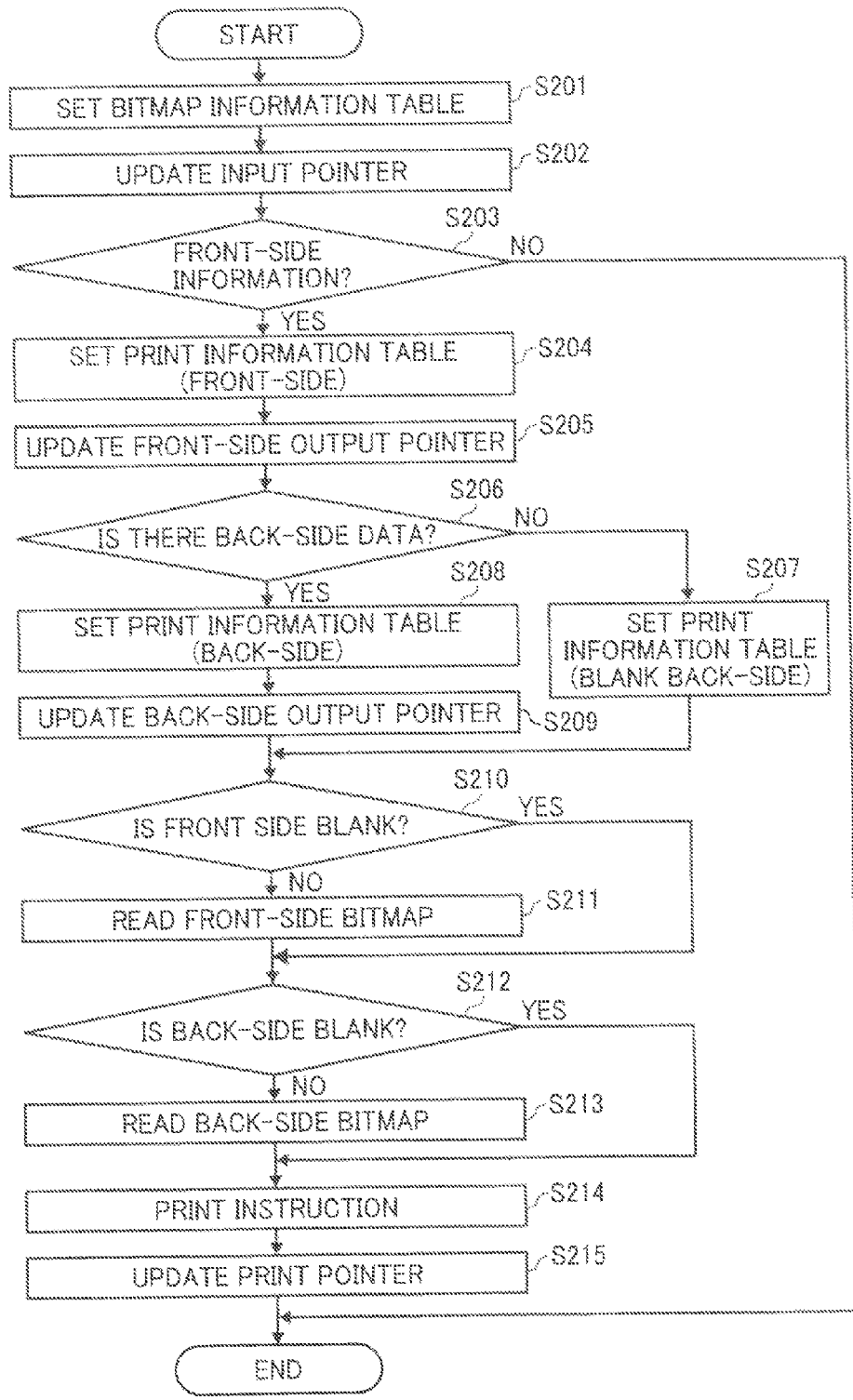
FIG. 8 is a flowchart showing an example of print processing executed by a print control unit upon reception of bitmap information.

FIG. 8 is a flowchart showing an example of print processing executed by the print control unit 506 upon reception of bitmap information.

Upon reception of the bitmap information from the RIP unit 502, the print management unit 509 of the print control unit 506 stores the bitmap information in the bitmap information tables 510 (step S201) and updates the input pointer 603 in the bitmap information table 510 to a value indicating a next position (step S202).

Next, the print management unit 509 determines whether or not the front-side bitmap information is received (step S203). If the front-side bitmap information is not received (step S203: No), the print processing is ended.

If the front-side bitmap information is received (step S203: Yes), the print management unit 509 stores, in a front-side information field in the print information table 511, the bitmap information indicated by output pointer 604 for the front-side in the bitmap information table 510 (step S204) and updates output pointer for the front-side to a value indicating a next position (step S205).

Next, the print management unit 509 determines whether or not the corresponding back-side bitmap information is received (step S206). If the back-side bitmap information is not received corresponding to the received front-side bitmap information (step S206: No), the print management unit 509 stores blank information in a back-side information field in the print information table 511 (step S207).

If the back-side bitmap information is received corresponding to the received front-side bitmap information (step S206: Yes), the print management unit 509 stores, in a back-side information field in the print information table 511, the back-side bitmap information pointed by the output pointer 604 for the back-side in the bitmap information table 510 (step S208) and updates the output pointer for the back-side to a value indicating a next position (step S209).

Next, the print management unit 509 determines whether or not the front-side bitmap information stored in the position indicated by a print pointer 605 in the print information table is blank information (step S210). If this front-side bitmap information is not blank information (step S210: No), the print management unit 509 reads the front-side bitmap to be printed from the RIP unit 502 according to the stored bitmap information (step S211).

If the front-side bitmap information is blank information (step S210: Yes), otherwise after the bitmap is read, the print management unit 509 determines whether or not the back-side bitmap information is blank information (step S212). If the back-side bitmap information is not blank information (step S212: No), the print management unit 509 reads the back-side bitmap to be printed from the RIP unit 502 according to the stored bitmap information (step S213).

If the back-side bitmap information is blank information (step S212: Yes), otherwise after the bitmap is read, the print management unit 509 transmits print information shown in the print information table 511 to the printer engine 507 to start printing (step S214). Then the print management unit 509 updates the print pointer 605 in the print information table 511 to a value indicating a next position (step S215).

The printer engine 507 prints bitmaps according to the received information. If blank information is received, the printer engine 507 simply feeds sheets and does not discharge toner or ink.

The blank data (for example, the blank data 201 in FIG. 5) necessary until the printer engine 507 starts back-side printing is generated by the print management unit 509. Therefore, it is not necessary to transmit the blank data from the RIP unit 502 to the print control unit 506. Since the blank information is included in the bitmap information, the transmission of the data for blank pages can be omitted.

Figure 9:
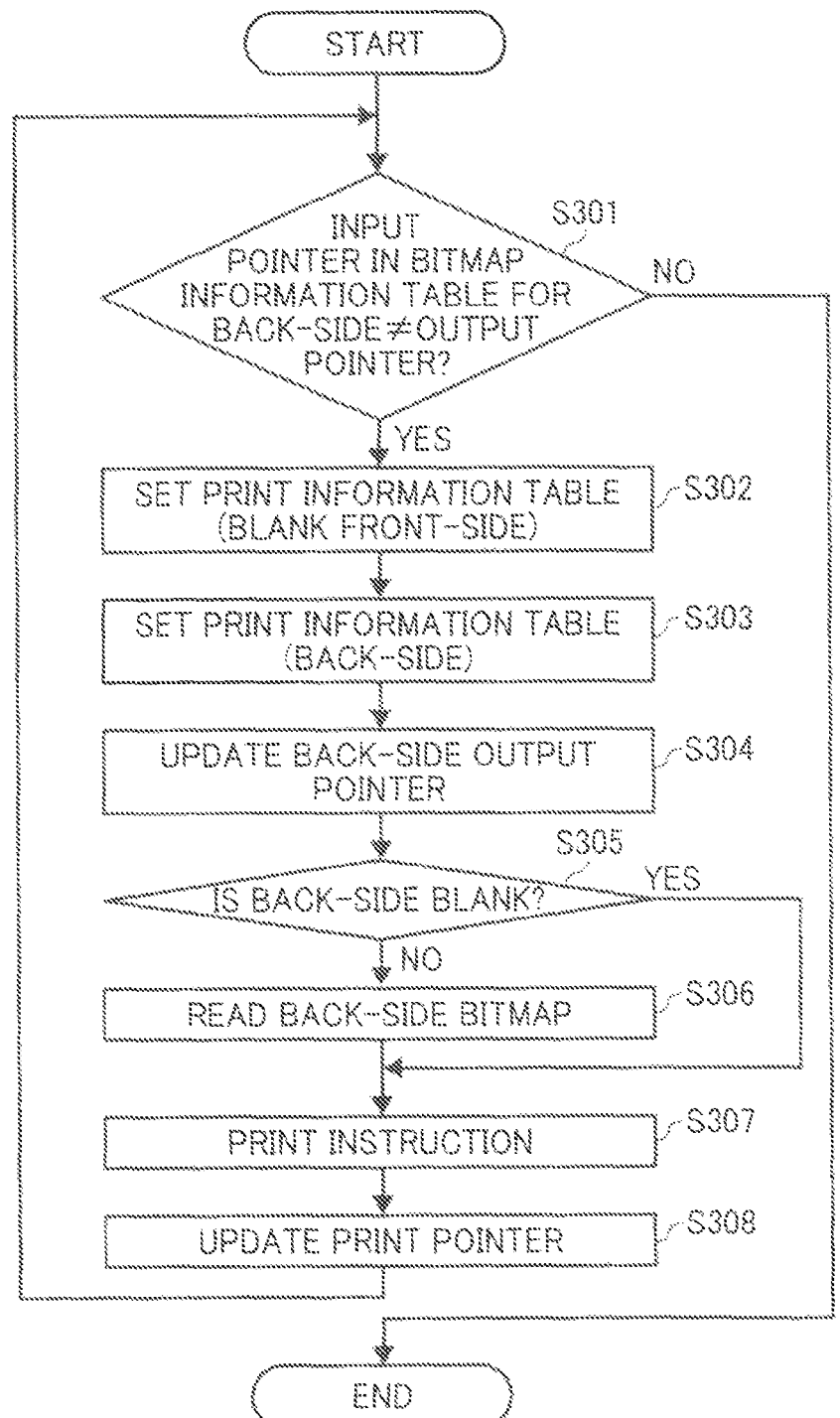
FIG. 9 is a flowchart showing an example of print processing executed by the print control unit upon reception of the end of data.

FIG. 9 is a flowchart showing an example of print processing executed by the print control unit 506 upon reception of the end of data.

Upon reception of the end of data from the RIP unit 502, the print management unit 509 of the print control unit 506 starts print processing for unprinted bitmaps (unprinted data) in the bitmap information table 510 for the back-side.

First, the print management unit 509 determines whether or not there is unprinted data (step S301). For example, the print management unit 509 compares the input pointer in the bitmap information table 510 for the back-side with the output pointer thereof. If these pointers are not the same, a determination is made that there is unprinted data.

If there is unprinted data (step S301: Yes), the print management unit 509 places blank information in a front-page information field in the print information table 511 (step S302). The print management unit 509 also stores, in a back-side information field in the print information table 511, the bitmap information indicated by the output pointer in the bitmap information table 510 for the back-side (step S303) and updates the output pointer to a value indicating a next position (step S304).

Next, the print management unit 509 determines whether or not the back-side bitmap information is blank information (step S305). If the back-side bitmap information is not blank information (step S305: No), the back-side bitmap data is read from the RIP unit 502 (step S306).

If the back-side bitmap information is blank information (step S305: Yes), otherwise after the back-side bitmap is read, the print management unit 509 transmits the print information indicated in the print information table 511 to the printer engine 507 to start printing (step S307). Then the print management unit 509 updates the print pointer 605 in the print information table 511 to a value indicating a next position (step S308).

If a determination is made in step S301 that there is no unprinted data (step S301: No), the print processing is ended.

As described above, in the image forming system in the first embodiment, the RIP unit performs boundary alignment when print data is generated. In this processing, the leading head of data to be place on the right side of the print area of the printer engine is boundary-aligned such that the most efficient form for a print instruction provided to the printer engine is achieved, and the print data is bitmapped page by page. This can suppress the transmission of blank data, and bit adjustment in the print control unit can also be omitted.

Second Embodiment

In the example described in the first embodiment, printing is performed with the upper edge position (print starting position) of a front-side bitmap aligned with the upper edge position of a back-side bitmap within the sheet registration area 103. However, in the second embodiment, an example is described in which printing is performed with these upper edge positions not aligned with each other.

Figure 10:
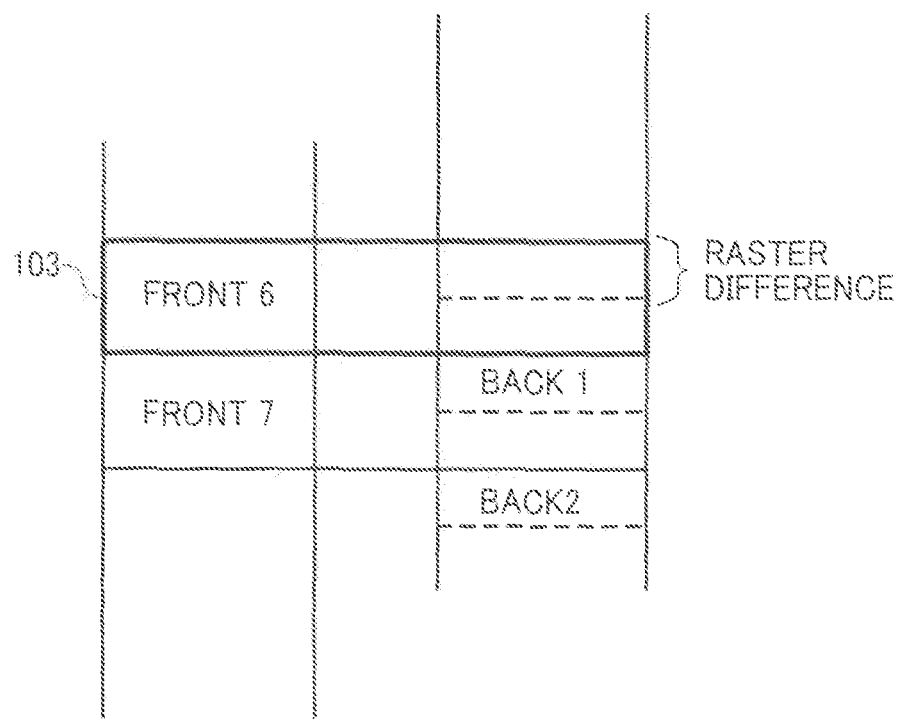
FIG. 10 is a diagram illustrating an example of the feeding state of sheets in a second embodiment.

FIG. 10 is a diagram illustrating an example of the feeding state of sheets in the second embodiment. As shown in FIG. 10, in the second embodiment, a front-side bitmap and a back-side bitmap within the sheet registration area 103 is printed in a displaced state from each other by one or more lines. This shift is referred to as a raster difference.

Figure 11:
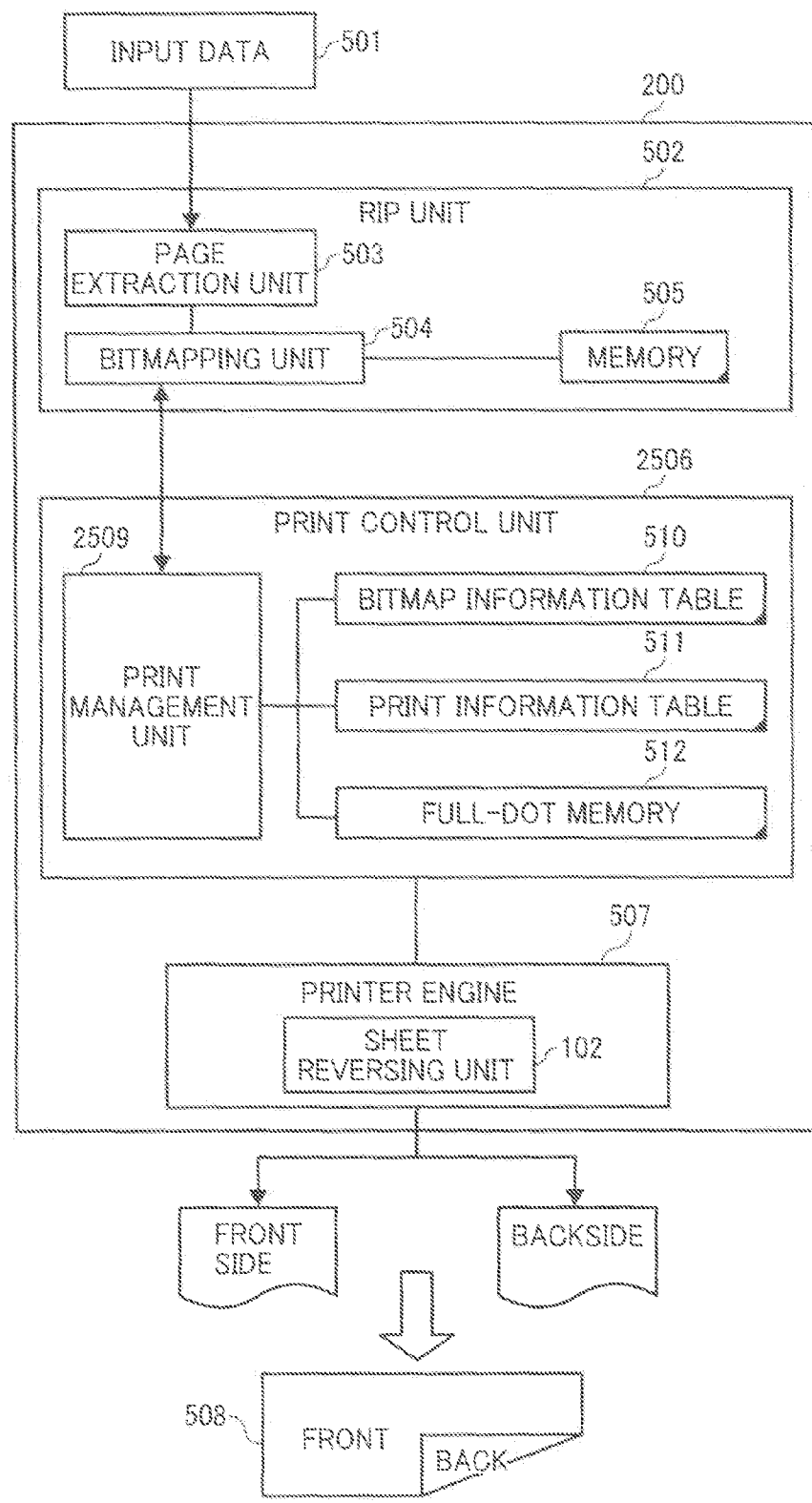
FIG. 11 is a block diagram illustrating an example of the configuration of an image forming system of the second embodiment.

FIG. 11 is a block diagram illustrating an example of the configuration of an image forming system 200 of the second embodiment. As shown in FIG. 11, the image forming system 200 includes, as main units, an RIP unit 502, a print control unit 2506, and a printer engine 507.

In the second embodiment, the function of a print management unit 2509 of the print control unit 2506 is different from that in the first embodiment. The other components are the same as those in FIG. 4 (the block diagram for the first embodiment) and are denoted by the same reference numerals, and a description will be omitted.

The print management unit 2509 computes a raster difference, generates merged bitmaps including front- and back-side bitmaps while making reference to the information of the raster difference, and then instructs the printer engine 507 to print the generated bitmaps.

Figure 12:
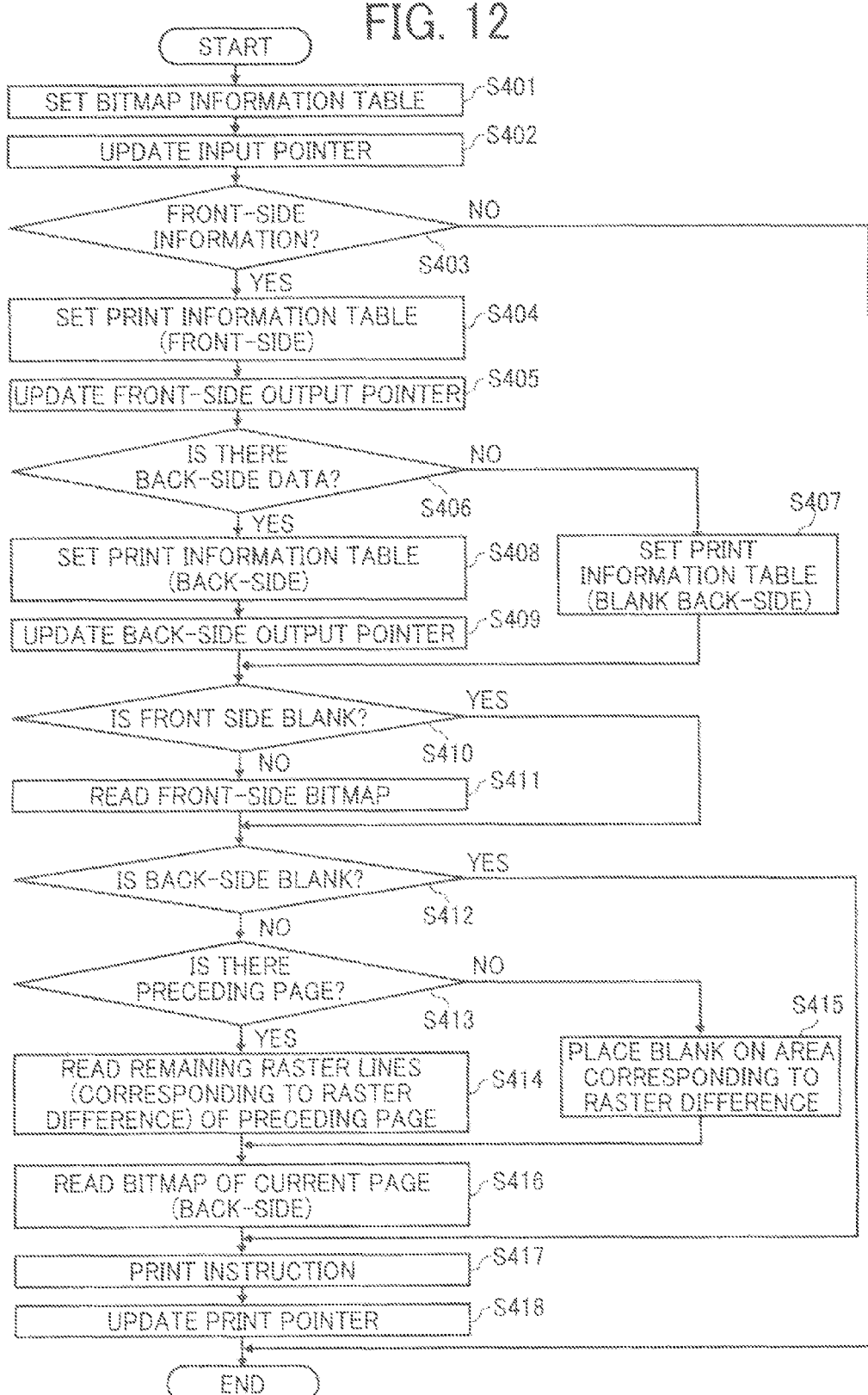
FIG. 12 is a flowchart showing an example of print processing executed by a print control unit upon reception of bitmap information.

Next, the print processing executed by the print control unit 2506 in the second embodiment configured as above will be described. FIG. 12 is a flowchart showing an example of the print processing executed by the print control unit 2506 upon reception of bitmap information.

Processing in steps S401 to S412 is the same as the processing in steps S201 to S212 in FIG. 8 showing the print processing of the first embodiment, and a redundant description will be omitted.

If a determination is made that the back-side bitmap information is not blank information (step S412: No), the print management unit 2509 determines whether or not there is any page preceding the currently processed back side (step S413). If there is a preceding page (step S413: Yes), the print management unit 2509 reads remaining raster lines of the preceding page from the RIP unit 502 (step S414). If there is no preceding page (step S413: No), the print management unit 509-2 places blank image data on an area corresponding to the raster difference (step S415).

For example, when the size of print data is changed to cause positional shift between the front and back-sides, the print management unit 2509 computes a raster difference corresponding to the positional shift. Then the print management unit 2509 stores the computed raster difference in association with, for example, the bitmap information in a back-side information field in the print information table 511 and makes reference to the raster difference when print processing is performed.

Next, the print management unit 509-2 reads the bitmap data of the currently processed page (back-side) from the RIP unit 502 (step S416). In this case, the print management unit 509-2 reads the bitmap data of the currently processed page, except for the data for an area located on the lower side in the feed direction and having a length in the feed direction corresponding to the raster difference.

Processing in steps S417 and S418 is the same as the processing in steps S214 and S215 in FIG. 8 showing the print processing of the first embodiment, and a description will be omitted.

Figure 13:
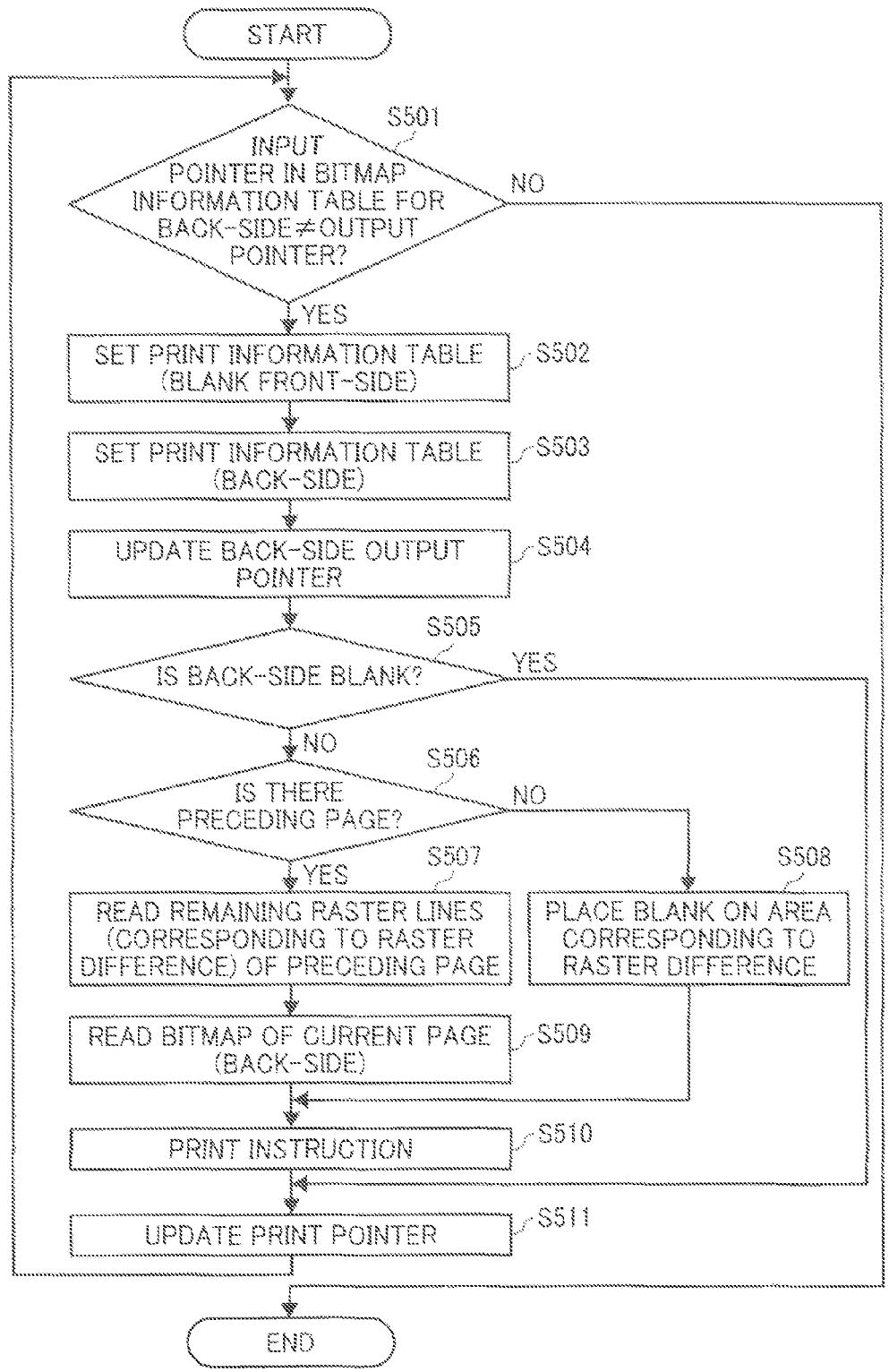
FIG. 13 is a flowchart showing an example of print processing executed by the print control unit upon reception of the end of data.

FIG. 13 is a flowchart showing an example of the print processing executed by the print control unit 2506 upon reception of the end of data.

Processing in steps S501 to S505 is the same as the processing in steps S301 to S305 in FIG. 9 showing the print processing of the first embodiment, and a description will be omitted. Processing in steps S506 to S511 is the same as the processing in steps S413 to S418 in FIG. 12, and a description will be omitted.

As described above, in the image forming system of the second embodiment, even when front- and back-side bitmaps are staggered (line shift occurs), duplex printing can be achieved as in the first embodiment.

According to the present invention, the efficiency of data transmission in a duplex print system such as an SED system can be advantageously improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus connected to a print control device that controls a single printer to print a first image on a first side of one of a plurality of continuous forms arranged in a predetermined first direction and to print a second image on a second side of another one of the continuous forms, the image processing apparatus comprising:
   a first generating unit that generates a first corrected image;
   a second generating unit that generates a second corrected image; and
   a transmission unit that transmits the first corrected image and the second corrected image to the print control device,
   wherein
   the first generating unit generates the first corrected image by adding an adjustment image to one edge in the predetermined first direction of the first image such that a length of the first image in the predetermined first direction is equal to an integral multiple of a predetermined boundary size,
   the second generating unit generates the second corrected image by adding the adjustment image to both edges in the predetermined first direction of the second image such that a length of the second image in the predetermined first direction is equal to the integral multiple of the predetermined boundary size, and
   the second generation unit generates the second corrected image by adding the adjustment image, having a length in the predetermined first direction equal to a difference between a leading head address obtained by subtracting the length in the predetermined first direction of the second image from a length in the predetermined first direction of a print area and a value equal to the integral multiple of the predetermined boundary size, provided that the value is smaller than the leading head address, to both edges in the predetermined first direction of the second image such that the length of the second image in the predetermined first direction is equal to the integral multiple of the predetermined boundary size.

2. The image processing apparatus according to claim 1, wherein the first generation unit generates the first corrected image by adding the adjustment image to the one edge in the predetermined first direction of the first image such that the length of the first image in the predetermined first direction is equal to a minimum integral multiple of the predetermined boundary size.

3. An image processing apparatus connected to a print control device that controls a single printer to print a first image on a first side of one of a plurality of continuous forms arranged in a predetermined first direction and to print a second image on a second side of another one of the continuous forms, the image processing apparatus comprising:
   a first generating unit that generates a first corrected image;
   a second generating unit that generates a second corrected image; and
   a transmission unit that transmits the first corrected image and the second corrected image to the print control device,
   wherein
   the first generating unit generates the first corrected image by adding an adjustment image to one edge in the predetermined first direction of the first image such that a length of the first image in the predetermined first direction is equal to an integral multiple of a predetermined boundary size,
   the second generating unit generates the second corrected image by adding the adjustment image to both edges in the predetermined first direction of the second image such that a length of the second image in the predetermined first direction is equal to the integral multiple of the predetermined boundary size, and the second generation unit generates the second corrected image by adding the adjustment image having a length in the predetermined first direction equal to a difference between a leading head address obtained by subtracting the length in the predetermined first direction of the second image from a length in the predetermined first direction of a print area and a value equal to a maximum integral multiple of the predetermined boundary size, provided that the value is smaller than the leading head address, to both edges in the predetermined first direction of the second image such that the length of the second image in the predetermined first direction is equal to the integral multiple of the predetermined boundary size.

4. The image processing apparatus according to claim 3, wherein the first generation unit generates the first corrected image by adding the adjustment image to the one edge in the predetermined first direction of the first image such that the length of the first image in the predetermined first direction is equal to a minimum integral multiple of the predetermined boundary size.

5. An image forming method executed in an image forming system including a single printer, a print control device to control the printer to print a first image on a first side of one of a plurality of continuous forms arranged in a predetermined first direction and to print a second image on a second side of another one of the continuous forms, and an image processing apparatus, the method comprising:

generating, by the image processing apparatus, a first corrected image by adding an adjustment image to one edge in the predetermined first direction of the first image such that a length of the first image in the predetermined first direction is equal to an integral multiple of a predetermined boundary size;

generating, by the image processing apparatus, a second corrected image by adding the adjustment image to both edges in the predetermined first direction of the second image such that a length of the second image in the predetermined first direction is equal to the integral multiple of the predetermined boundary size;

transmitting, by the image processing apparatus, the first corrected image and the second corrected image to the print control device;

receiving, by the print control device, the first corrected image and the second corrected image;

generating, by the print control device, a print image merged of the first corrected image with the second corrected image; and instructing, by the print control device, the printer to print the print image, wherein the second corrected image is generated by adding the adjustment image, having a length in the predetermined first direction equal to a difference between a leading head address obtained by subtracting the length in the predetermined first direction of the second image from a length in the predetermined first direction of a print area and a value equal to the integral multiple of the predetermined boundary size, provided that the value is smaller than the leading head address, to both edges in the predetermined first direction of the second image such that the length of the second image in the predetermined first direction is equal to the integral multiple of the predetermined boundary size.

6. The image forming method according to claim 5, wherein the first corrected image is generated by adding the adjustment image to the one edge in the predetermined first direction of the first image such that the length of the first image in the predetermined first direction is equal to a minimum integral multiple of the predetermined boundary size.

\* \* \* \* \*